United States Patent [19]
Conrad et al.

[11] Patent Number: 5,439,366
[45] Date of Patent: Aug. 8, 1995

[54] SAFETY DEVICE FOR A ROLL SPACE OF A CALENDER OR SIMILAR ROLL MACHINE

[75] Inventors: Hans-Rolf Conrad, Dormagen; Jochen Autrata, Duisburg; Albert Hille, Aachen, all of Germany

[73] Assignee: Kleinewefers GmbH, Krefeld, Germany

[21] Appl. No.: 141,182

[22] Filed: Oct. 21, 1993

[30] Foreign Application Priority Data

Oct. 21, 1992 [DE] Germany ............... 42 35 421.8

[51] Int. Cl.⁶ ............... B29C 43/24; B41F 33/00; D21G 5/00
[52] U.S. Cl. ............... 425/151; 74/609; 100/173; 226/181; 267/136; 425/194; 425/363; 425/DIG. 45; 425/DIG. 235
[58] Field of Search ............... 425/363, 367, DIG. 235, 425/194, 151, 141, DIG. 45; 188/378-380; 267/136; 248/559, 566; 100/53, 173, 176; 74/609, 612; 226/181

[56] References Cited

U.S. PATENT DOCUMENTS

| | | | |
|---|---|---|---|
| 2,908,456 | 10/1959 | Gertel | 248/566 |
| 3,085,657 | 4/1963 | Preis | 188/380 |
| 3,435,918 | 4/1969 | Chombard | 188/378 |
| 4,476,969 | 10/1984 | Dykema | 188/380 |
| 4,807,840 | 2/1989 | Baker et al. | 248/559 |
| 5,133,115 | 7/1992 | Bock | |
| 5,241,903 | 9/1993 | Lampic | 100/53 |
| 5,263,560 | 11/1993 | Bayer | 188/380 |

FOREIGN PATENT DOCUMENTS

| | | |
|---|---|---|
| 3024917 | 5/1982 | Germany . |
| 3719305 | 5/1982 | Germany . |
| 3124330 | 8/1982 | Germany . |
| 4030150 | 3/1992 | Germany . |

OTHER PUBLICATIONS

"Kempe's Engineers Yearbook", 1987, Chapter B4, pp. 39-45.

Primary Examiner—James P. Mackey
Attorney, Agent, or Firm—Darby & Darby

[57] ABSTRACT

A safety device for the roll space within a calender or other roll machine is disclosed. The rolls when rotating, excite oscillations in the beam at the resonant frequency of the beam. This can occur during start-up or during normal operation. The safety device of the present invention comprises a beam and additional mass that is oscillatorily suspended from the beam in order to reduce the amplitude of the beam oscillations at the beam resonant frequency. In addition, a damping element between additional mass and the beam is used to reduce any undesired oscillations due to newly created resonant frequencies introduced into the system.

18 Claims, 1 Drawing Sheet

SAFETY DEVICE FOR A ROLL SPACE OF A CALENDER OR SIMILAR ROLL MACHINE

BACKGROUND OF THE INVENTION

The present invention relates in general to safety devices and in particular to a safety device for a roll space of a calender or similar roll machine having a beam in front of the roll space that is transverse to the rolls on the calender and substantially parallel to the roll space.

A prior art safety device is described in DE 37 19 305 C1. In such a device, the beam consists of a carrier provided with protection bars that can be moved closer to the individual rolls that form the roll space in order to satisfy applicable safety standards. Accordingly, the space between the safety device and the rolls that define the roll space should not exceed 8 millimeters (mm).

Another prior art safety device is described in DE 40 30 150 C1. In that device, the bars need not be moveable with respect to the carrier, but rather may be fixedly connected to the carrier or integrally formed therewith.

Prior art safety devices tend to undergo undesirable oscillations during start-up periods or during normal operation when the rotational frequency of the rolls coincide with the resonant frequency of the devices. The magnitude of the oscillation in the middle of the beam can approach or exceed 10 mm. Therefore, safety problems in the work place may result due to the increased clearance between the rolls and the beam.

It is an object of the present invention to improve the safety effectiveness of a safety device for a roll machine.

SUMMARY OF THE INVENTION

The present invention results in an improved safety device by providing additional mass that is connected or fastened to the beam by one or more spring elements. In this manner, the mass is oscillatorily suspended from the beam. Therefore, the previously known one mass oscillator systems employed in safety devices is converted into a two mass oscillator system. By appropriate selection of the spring element and the mass, the motion of the mass results in an equilibrium force that acts on the beam during oscillations at the critical frequency. The initial excitation force acting on the beam is now opposed by a substantially equal counter force. In this manner, the deflection amplitude of the beam can be greatly reduced. In addition, the beam can be positioned sufficiently close to the rolls so that any prescribed safety standard dimensions are maintained without running the risk of the beam coming into contact with the rolls during any oscillatory periods.

It is preferable to also have the mass connected to the beam by way of a damping element. By using an additional, oscillating mass, new resonant frequencies are introduced. Depending on the various system parameters, these resonant frequencies may lie within the operating frequency range of the calender or roll machine. However, the movement of the beam and the safety device due to the newly created resonant frequency can be reduced by the damping element.

In constructing the safety device of the present invention, the spring element and the damping element are preferably connected in parallel. This helps to minimize the height of the structure and results in a fairly compact design. In addition, it is preferable to support the mass in a linear guide in order to fix the direction of oscillation, as well as simplifying the layout, calculation, and design. The presence of the additional mass also helps to avoid oscillations that are excited in other directions.

The guide should preferably be aligned in the direction of greatest deflection. This direction is commonly in the direction in which the beam has the least rigidity. However, this direction may deviate slightly based upon the excitation forces. In practice, the direction of the greatest deflection is determined from an excitation beam and the guide is then aligned accordingly.

The spring element is advantageously constructed of two parts with the mass received therebetween. The mass, is thus simultaneously subject to a tensile force and a pressure force when it is not in the at rest position. In this configuration, any deviations in the characteristics of the spring components are equalized when subject to a tensile or pressure force. In addition, the space required for the movement of the mass is much simpler to arrange.

It is also advantageous to provide for pretensioning of the spring and to allow for external adjustment. By adjusting the pretension of the spring, the oscillation characteristics of the two mass oscillator system can be modified. The additional mass can thus be adapted to the specific requirements of a particular roll machine after it is installed. Likewise, it is advantageous to provide a means for changing the magnitude of the mass after the system is installed.

It is preferable to have the resonant frequency of the attenuation system formed by the mass and spring element correspond to the resonant frequency of the beam. In this manner, the best damping and therefore the smallest amplitude deviations are achieved.

It is contemplated that the mass is arranged in a frame which is inserted into the beam. The mass may be suspended within the frame in order to achieve oscillation and damping. All the components necessary for the damping mechanism can be assembled outside of the beam and then the completed assembly inserted into the beam. This can be achieved due to the fact that most beams are formed with a hollow profile. Also, the mass element may be divided into several partial masses when space limitations preclude the use of a single mass element. In this situation, the several partial masses are arranged in order to oscillate parallel to each other.

The mass is preferably placed in the axial central area of the beam and positioned symmetrically with respect thereto, since this is the area in which most deflections occur, and thus, damping is most effectively achieved.

BRIEF DESCRIPTION OF THE DRAWINGS

The foregoing brief description or further objects, features, and advantages of the present invention will be understood more completely from the following description of presently preferred embodiments with reference to the drawings in which.

DETAILED DESCRIPTION OF THE PREFERRED EMBODIMENTS

Figure 1:
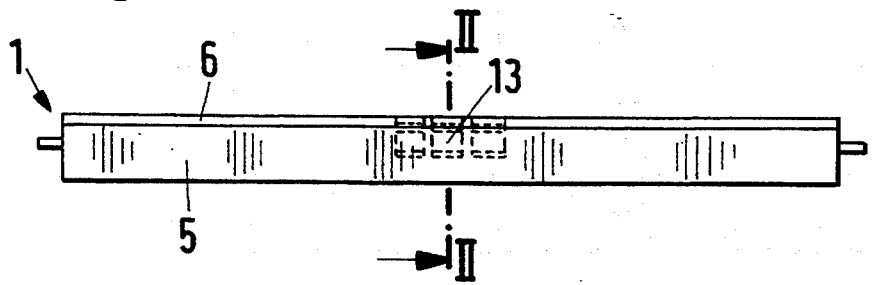
FIG. 1 is a top view of the safety device of the present invention.
Figure 2:
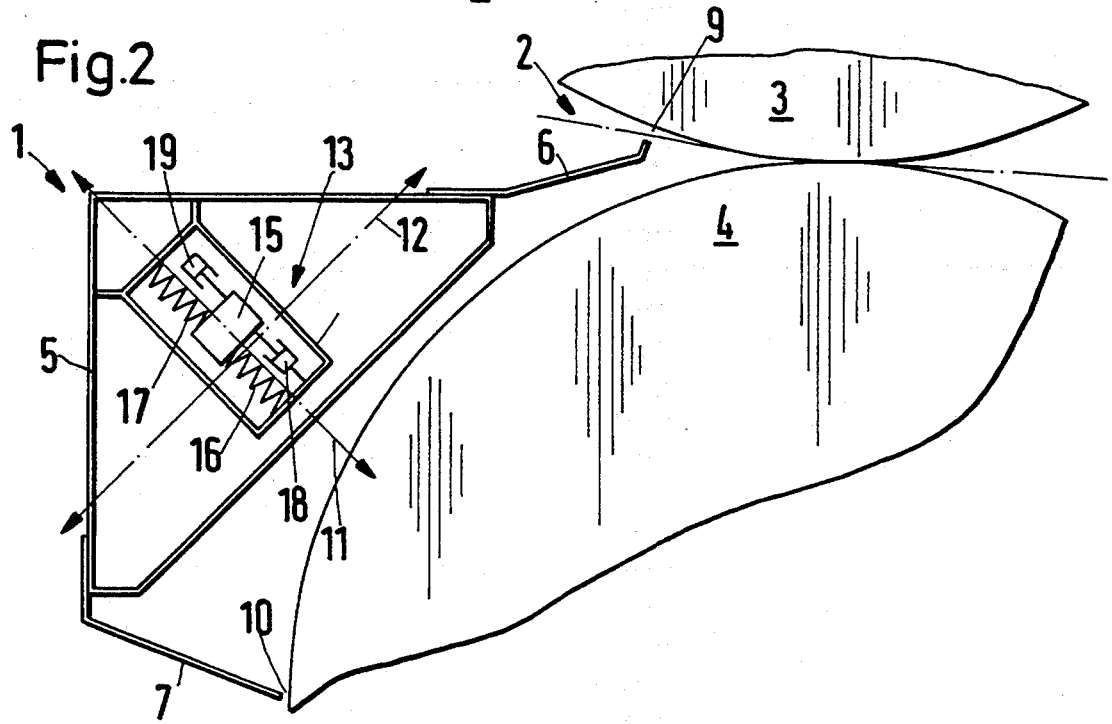
FIG. 2 is an enlarged sectional view along the line II—II of FIG. 1.

Referring now to FIGS. 1 and 2, a safety device 1 consists essentially of a beam arranged in front of and substantially parallel to a roll space 2 defined by rolls 3 and 4. The beam includes a carrier 5 on which are arranged safety bars 6 and 7. In this embodiment, the safety bars 6 and 7 are rigidly connected to the carrier 5. Alternatively, the safety bars 6 and 7 may be moveably connected to carrier 5. Carrier 5 is suspended by both of its ends or by brackets (not shown) which also support rolls 3 and 4.

The space 9 located between roll 3 and safety bar 6, as well as space 10 located between roll 4 and safety bar 7, must not exceed a size of approximately 8 mm in order to avoid endangering the safety of service personnel while the machine is in operation. However, during start-up of the roll machine, oscillations are formed and transferred to the carrier 5 and safety bars 6 and 7 which in turn can be excited into the same oscillatory behavior. The movement of the beam in space can be separated into two directions normal to each other. These directions are illustrated as double arrows 11 and 12 in FIG. 2. The largest movement amplitudes occur in the direction of arrow 11. Relatively small amplitude movements are found in direction 12 and can therefore be ignored. The carrier 5 and safety bars 6 and 7 have their minimum bending rigidity in the indicated direction of double arrow 11.

The oscillation amplitude of carrier 5 and safety bars 6 and 7 can easily exceed 10 mm. This is not quite as critical for space 9 adjacent roll 3. However, such a large movement (10 mm) will result in contact between safety bar 7 and roll 4 because, by defined safety standards, space 10 must not exceed 8 mm.

In calenders and other roll machines, the available space around the rolls is rather limited so that the safety device 1 cannot be supported on or dampened from the outside. Therefore, in order to minimize the oscillation amplitude, an attenuation system 13 is inserted into the beam. As illustrated in FIG. 1, several systems 13 can be inserted into the beam. They should be arranged in the middle of the beam and symmetrical thereabout.

Figure 3:
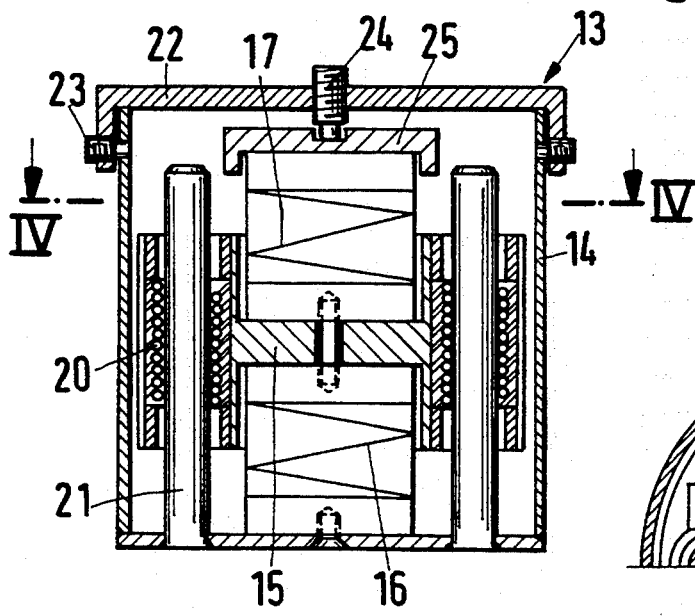
FIG. 3 is a cross sectional view of a damping device.

Referring now to FIG. 3, each attenuation system 13 includes a frame or a housing 14 which is fixedly connected with carrier 5. A mass 15 is, with the help of two springs 16, 17, oscillatorily suspended in frame 14 and thereby on carrier 5. Damping elements 18, 19 (see FIG. 2) are arranged parallel to springs 16, 17 and, likewise, between mass 15 and frame 14 of the attenuation system 13. Springs 16, 17 and damping elements 18, 19 have only been illustrated schematically. Various types of springs can be used, such as spiral-or screw springs of metal or man-made material, blade springs, dished disk springs, or the like. The damping elements 18, 19 can be formed as hydraulic dampers. Alternatively, the damping elements 18, 19 may be friction devices or the like.

Springs 16, 17 may be integrally formed with damping elements 18, 19. However, it is essential that mass 15 be oscillatorily suspended in order to dampen any oscillations. The resonant frequency of the attenuation system 13 is approximately equal to or, in other words, corresponds to the resonant frequency of the carrier 5 and safety bars 6 and 7. The damping of the damping elements 18, 19 is adjusted in such a way that any newly occurring resonance frequencies created by forming a two-mass oscillator consisting of a first mass (mass 15) and a second mass (carrier 5 and safety bars 6 and 7 including the parts connected thereto) are effectively damped when compared to the resonance frequency of the second mass alone. The oscillation amplitudes can thus be held to very small values at these locations.

Figure 4:
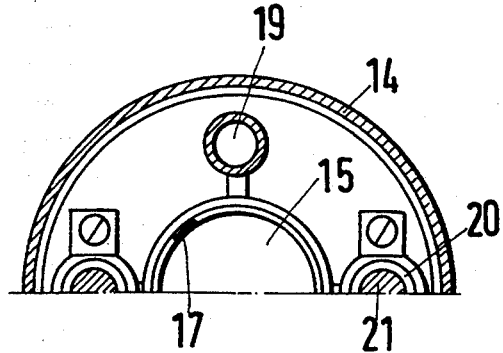
FIG. 4 is a sectional view along the line IV—IV of FIG. 3.

The inner construction of attenuation system 13 is further illustrated in FIGS. 3 and 4. Mass 15 is guided in guides 21 with the aid of ball bearings 20 which are fastened to frame 14 of the attenuation system 13. The attenuation system 13 is mounted in carrier 5 in such a way that the guides 21 are arranged parallel to the direction of double arrow 11. The ball bearings 20 reduce the friction on guides 21, so that no additional and undesirable friction induced dampings are created. In this way, the damping is solely dependent on the characteristics of damping elements 18, 19. The guides 21 allow movement of the mass 15 and any parts connected thereto only in a predetermined direction, namely in the direction of double arrow 11. This is the direction of the largest deflection due to excitation of carrier 5 and safety bars 6 and 7.

Each damping element 18, 19 may be divided into two dampers, with one damper positioned in the front portion of frame 14 and the other damper positioned in the rear portion of frame 14, as shown in FIG. 3. This is also depicted schematically in FIG. 4. Alternatively, the damping can be effected by a damping cushion of wire mesh which is arranged within a screw spring.

The frame 14 is closed with a cover 22 which is fastened to frame 14 by way of screws 22. An adjusting screw 24 is provided on cover 23 in order to vary the position of pressure plate 25. The pressure plate 25 together with the bottom of frame 14 generate the pretensioning of springs 16, 17. By adjusting the adjusting screw 24, the pretension of springs 16, 17 can be changed. The resonance frequency of the attenuation system 13 can thereby be modified within certain limits. In addition, the adjusting screw 24 is also accessible from the outside after the attenuation system has been installed. In this manner, the resonant frequency of the attenuation system 13 can be matched with the resonant frequency of the beam after the attenuation system 13 is positioned in place. In an alternative embodiment of the present invention, the magnitude of the mass 15 can be changed by adding or removing supplemental mass elements.

Tests were performed on a roll machine having a beam length of 7600 mm, a mass of approximately 200 kg and a resonant frequency of 6,875 Hz. This roll machine was then excited by an eccentric disk having an imbalance of 12,000 gram. Without the additional oscillatory mass of the present invention, oscillating speeds up to 156 mm/s and oscillating amplitudes of approximately 11 mm were observed. After installing the attenuation system 13 of the present invention, the speed was reduced to 32 mm/s and the amplitude to about 2.5 mm. In addition, the deflection behavior was considerably improved. Upon a manual start-up to an oscillation speed of ±40 mm/s, the oscillation speed without the attenuation system 13 was reduced relatively slowly, while after the installation of the attenuation system, the speed was quickly and significantly reduced. Without the attenuation system 13, speeds of ±35 mm/s were still observed after 0.4 seconds while with the attenuation system 13, the maximum observed speed was reduced to ±7 mm/s.

Thus, by installing an additional mass according to the present invention, the oscillation amplitude in the resonance area can be considerably reduced, by up to a factor of four. In this manner, any mandated safety specification distances can be maintained with great accuracy.

While the invention has been particularly shown and described with reference to preferred embodiments thereof, it will be understood by those skilled in the art that various changes in form and detail may be made therein without departing from the spirit and scope of the invention.

We claim:

1. A safety device for a roll space of a roll machine comprising:
   a first roller having a longitudinal axis;
   a second roller having a longitudinal axis, said second roller being disposed adjacent to said first roller such that a roller gap is disposed between said first roller and said second roller;
   a beam being disposed in front of said roller gap, said beam having a longitudinal axis that is parallel to said longitudinal axis of said first roller and said longitudinal axis of said second roller, said beam having a predetermined mass, said beam having a mass element fastened thereon, said mass element being connected to said beam by a spring such that said beam and said mass element form a two mass oscillator system.

2. A safety device according to claim 1, wherein said mass element is connected to said beam by a plurality of damping elements.

3. A safety device according to claim 2, wherein said spring is arranged parallel to said plurality of damping elements.

4. A safety device according to claim 1, wherein said mass element is linearly movably fastened to said beam by a guide.

5. A safety device according to claim 2, wherein said mass element is linearly movably fastened to said beam by a guide.

6. A safety device according to claim 3, wherein said mass element is linearly movably fastened to said beam by a guide.

7. A safety device according to claim 4, wherein said guide is aligned in a direction of a largest deflection of said beam.

8. A safety device according to claim 5, wherein said guide is aligned in a direction of a largest deflection of said beam.

9. A safety device according to claim 6, wherein said guide is aligned in a direction of a largest deflection of said beam.

10. A safety device according to claim 1, wherein said spring comprises two springs with said mass element connected therebetween.

11. A safety device according to claim 1, further comprising external means for adjusting a pretensioning of said spring.

12. A safety device according to claim 10, further comprising external means for adjusting a pretensioning of said springs.

13. A safety device according to claim 1, wherein the mass of said mass element is externally adjustable.

14. A safety device according to claim 10, wherein the mass of said mass element is adjustable.

15. A safety device according to claim 1, wherein a first resonant frequency of said mass element and said spring is approximately equal to a second resonant frequency of said beam.

16. A safety device according to claim 1, further comprising a frame for receiving said mass element said frame being fixed with respect to said beam.

17. A safety device according to claim 1, wherein said mass element comprises a plurality of individual partial masses.

18. A safety device according to claim 1, wherein said beam has a longitudinal length, said mass element being positioned in a middle of said longitudinal length of said beam.

* * * * *